(12) United States Patent
Chen et al.

(10) Patent No.: US 12,112,054 B2
(45) Date of Patent: Oct. 8, 2024

(54) COORDINATED PERSISTENT MEMORY DATA MIRRORING

(71) Applicant: DELL PRODUCTS L.P., Round Rock, TX (US)

(72) Inventors: Tao Chen, Beijing (CN); Shuguang Gong, Beijing (CN); Yong Zou, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/985,364

(22) Filed: Nov. 11, 2022

(65) Prior Publication Data
US 2024/0160373 A1 May 16, 2024

(51) Int. Cl.
*G06F 3/06* (2006.01)

(52) U.S. Cl.
CPC ............ *G06F 3/065* (2013.01); *G06F 3/0619* (2013.01); *G06F 3/0653* (2013.01); *G06F 3/067* (2013.01)

(58) Field of Classification Search
CPC ...... G06F 3/065; G06F 3/0619; G06F 3/0653; G06F 3/067
See application file for complete search history.

(56) References Cited

U.S. PATENT DOCUMENTS

| | | | |
|---|---|---|---|
| 5,742,792 A | 4/1998 | Yanai et al. | |
| 10,852,962 B1* | 12/2020 | Goodwill | G06F 3/0689 |
| 2009/0228670 A1* | 9/2009 | Nakagawa | G06F 11/1662 |
| | | | 711/E12.001 |
| 2011/0066592 A1* | 3/2011 | Newport | G06F 16/273 |
| | | | 707/615 |
| 2016/0283284 A1 | 9/2016 | Sun et al. | |
| 2016/0378713 A1* | 12/2016 | Kaimalettu | G06F 3/065 |
| | | | 709/212 |
| 2018/0074909 A1 | 3/2018 | Bishop et al. | |
| 2018/0157565 A1* | 6/2018 | Warnes | G06F 11/1458 |
| 2021/0124758 A1* | 4/2021 | Bottari | H04L 43/10 |
| 2021/0406091 A1 | 12/2021 | Thyagaturu et al. | |
| 2022/0206975 A1* | 6/2022 | Gopal | H03M 7/60 |
| 2022/0405753 A1* | 12/2022 | Lee | G06F 16/27 |
| 2024/0045770 A1* | 2/2024 | Kumar | G06F 9/45558 |

* cited by examiner

*Primary Examiner* — Hiep T Nguyen
(74) *Attorney, Agent, or Firm* — WOMBLE BOND DICKINSON (US) LLP

(57) ABSTRACT

Disclosed is a method for preforming the data mirror comprising: receiving from an application executing on a computing device a request to write data to a first local persistence memory of the computing device; issuing an async write operation to mirror the write request to write a same data to a second local persistence memory of the computing device by using a supplemental device; performing a write operation to write the data to the first local persistence memory by using a central processing unit (CPU) from the processing resource of the computing device; in response to determining that the write operation is completed and the async write operation is completed, determining a status check result indicating if the async write operation is successful; and sending the status check result to the application.

20 Claims, 7 Drawing Sheets

COORDINATED PERSISTENT MEMORY DATA MIRRORING

FIELD OF THE INVENTION

Embodiments of the present invention relate generally to the persistent memory technology. More particularly, embodiments of the invention relate to the coordinated persistent memory data mirroring.

BACKGROUND

With Persistent Memory technology being increasingly playing an important role in modern storage systems (e.g., the traditional NVRAM devices will be replaced by the Persistent Memory), protecting data against uncorrectable errors on Persistent Memory is becoming a priority, for single node, high availability (HA), and also cluster systems.

However, at the same time, protecting data against uncorrectable errors on Persistent Memory solely by using a central processing unit (CPU) from the processing resource of the computing device will increase the workload of the CPU.

Therefore, there is a need to find a way to reduce the workload of the CPU while still protecting data against uncorrectable errors on Persistent Memory.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
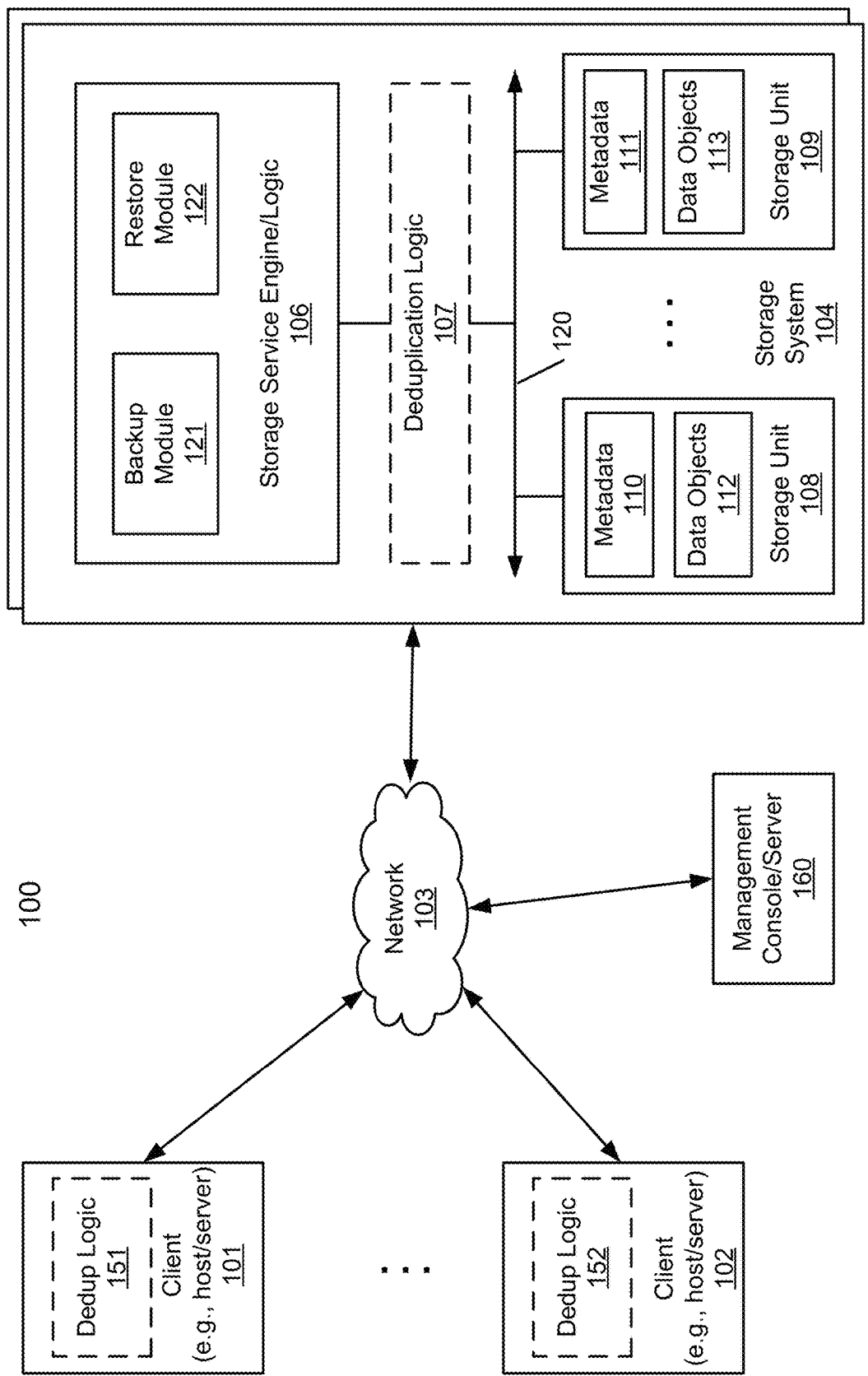
FIG. 1 is a block diagram illustrating a storage system, according to an embodiment of the application.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Data protection applications, like Data Domain Filesystem, save critical run-time data on Persistent Memory and use them for system recovery after power failures. However, critical data can be lost due to uncorrectable errors. In current Persistent Memory eco-system, there is no existing method to protect critical data against uncorrectable errors.

Data mirroring is a solution but comes with significant overhead. As Persistent Memory is used in Direct Access (DAX) mode from user space in most cases, mirroring data essentially means an extra memory copy operation by CPU. DAX mode refers to the mechanism that enables direct access to files stored in persistent memory arrays without the need to copy the data through the page cache. CPU resource is so precious for data protection applications that mirroring data by CPU can be unacceptable due to its doubled CPU consumption. Thus, there is a need for optimized data mirroring methods with reduced overhead.

It should be noted that in this disclosure, data mirroring refers to making a data copy on local Persistent Memory, and mirroring to remote is out of this disclosure scope. Further, local data mirroring is valuable and can be used as building block for other use cases.

The core of this disclosure is to use asynchronous Persistent Memory access interfaces to implement data mirroring.

The status quo of asynchronous Persistent Memory access methods includes, for example, Intel platforms (with Sapphire Rapids Xeon Processors), Intel DSA (Data Streaming Accelerator) technology and related software can provide async Persistent Memory access methods. For other platforms, a remote direct memory access (RDMA) network interface card (NIC) and software stack can be leveraged for asynchronous Persistent Memory access. This disclosure proposes a RDMA-based or DSA implementation of async Persistent Memory access interfaces, which is "Using RDMA Loopback to Implement Asynchronous Persistent Memory Access in DAX Mode". Altogether asynchronous Persistent Memory Access methods are generally available.

In an embodiment, a processing logic receives a request to write data to a first local persistence memory of the computing device an application executing on a computing device of the data mirror system. Next, processing logic issues an async write operation to mirror the write request to write a same data to a second local persistence memory of the computing device by using a supplemental device.

Next, the processor of the data mirroring system performs a write operation to write the data to the first local persistence memory by using CPU from the processing resource of the computing device. In response to determining that the write operation is completed and the async write operation is completed, the processor of the data mirroring system then determines a status check result indicating if the async write operation is successful.

Next, the processor of the data mirroring system sends the status check result to the application. For example, if the processor of the data mirroring system determines an error status check result indicating that the async write operation is not successful, the application will then reissue the async write operation.

For example, loopback message is a message that is sent in an RDMA device. If the used destination address attributes are different than the address of the source port; even if both ports belong to the same RDMA device—this message isn't considered a loopback message. Unlike other protocols (for example, Ethernet) that loopback of message may be handled by software (i.e., network stack) and the device isn't aware to the existence of that message. In RDMA, all the Work Request processing is done by the RDMA device; the RDMA device will fetch this Work Request, process it, fetch the needed data and store it, ignoring the fact that this is a loopback message, and at the end generate Work Completion(s)—if needed. Also, Software, doesn't have to be aware that a message is a loopback message. That is, if there is a specific application that has several processes that are running in several machines, and part of them may run on the same machine. Loopback messages can be a fast way to copy big blocks of data in the same machine (and even maybe in the same process) asynchronicity. Since DMA is using a different engine than the CPU, this way has an advantage by leaving the CPU to do other things.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine (also referred to as service logic, service module, or service unit, which may be implemented in software, hardware, or a combination thereof), optional deduplication logic 107, and one or more persistent storage units or devices 108-109 communicatively coupled to each other. Storage service engine may represent any storage service related components configured or adapted to provide storage services (e.g., storage as a service) to a variety of clients using any of the access protocols set forth above. For example, storage service engine may include backup logic 121, restore logic and compress module 122. Backup logic 121 is configured to receive and back up data from a client (e.g., clients 101-102) and to store the backup data in any one or more of persistent storage units 108-109. Restore logic is configured to retrieve and restore backup data from any one or more of persistent storage units 108-109 back to a client (e.g., clients 101-102). Compress module 122 is configured to compress and back up data from a client (e.g., clients 101-102) and to store the backup data in compress data segments 123 in SSD Cache Device 124.

Persistent storage units 108-109 may be implemented locally (e.g., single node operating environment) or remotely (e.g., multi-node operating environment) via interconnect 120, which may be a bus and/or a network (e.g., a storage network or a network similar to network 103). Persistent storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of persistent storage units 108-109 may be located locally or remotely accessible over a network.

In response to a data file to be stored in persistent storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of persistent storage units 108-109 or across at least some of persistent storage units 108-109. The metadata, such as metadata 110-111, may be stored in at least some of persistent storage units 108-109, such that files can be accessed independent of another storage unit. Metadata of each storage unit includes enough information to provide access to the files it contains.

Deduplication

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set. When a deduplicated data block is updated with a new content, a new data block is created containing the new updated content. Mapping of the deduplicated block is then changed to point to the new data block and the deduplicated block no longer points to the single copy of the data. This process is referred to as reduplication.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file do not constitute an entirely new file. The sharing of file system data blocks conserves data storage for storing files in a data storage system. The snapshot copy facility is a space saving technology that enables sharing of file system data blocks among versions of a file. On the other hand, a deduplication facility enables the sharing of file system data blocks within a file, among versions of a file, between versions of a file and unrelated files, and among unrelated files. Therefore, the deduplication facility eliminates from the data storage system any file system data blocks containing duplicative data content.

Deduplication of data happens in two logically distinct operations: detection and remapping. The detection operation identifies blocks containing the same data. The remapping operation updates address maps that record physical locations of logical units (LUNs) of data so that a single block of data is shared by multiple LUNs or by multiple positions within the same LUN. Detection is accomplished by building a database (e.g., index table) that maintains a digest (e.g., SHA, checksum) and, a deduplication key for each data block. When two data blocks have the same digest they have a sufficiently high probability of containing the same data to warrant a bit-for-bit comparison to confirm they are exact duplicates.

A goal of deduplication logic 107 is to maintain only a single copy of each unique set of data within a data set. To achieve that goal, deduplication logic 107 finds data blocks that have not been deduplicated and processes data blocks for deduplication by computing digests for data blocks. A digest is a representation of contents stored in a data block. Further, the digest is mathematically computed (e.g., MD5, SHA-1, SHA-2) in such a way that, computationally, there is a very low or zero probability of finding two data blocks that have the same digest but different contents. If the digest for the data block is sent together with the data block, a recipient of the data block can compute a new digest from the received data block and can compare the new digest with the received digest to determine whether the received data block is valid. Additionally, a digest is stored in an index table in order to process data blocks within the data set for deduplication. Further, a deduplication key identifying a data block is also stored in index table along with the digest for the data block.

A deduplication key uniquely identifies a data block by storing information (such as logical address, physical address) of the data block. Deduplication logic 107 identifies data blocks that can potentially be deduplicated by comparing digests of data blocks with list of digests stored in the index table. Further, when data blocks are deduplicated after comparing digest information, deduplication logic 107 updates metadata of deduplicated data blocks. Additionally, deduplication logic 107 updates metadata of a data block when the data block is reduplicated.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmit data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

Cloud-Based/Virtualized Storage

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HIDFS) to a client based on a storage policy or service level agreement associated with that particular client as part of software-defined storage services.

Replication

A replicator replicates an original file system on a replicated file system. The replicated file system can be accessed by both the replicator and clients. To perform file replication, the replicator may create, delete or modify files on the replicated file system. In some embodiments, clients can read files on the replicated file system, but may not create, delete or modify files. In some embodiments, the replicator duplicates the replicated file system based on the original file system during initialization. In some embodiments, to efficiently initialize the replicated file system, the original file system is copied to the replicated file system via a network connection or using removable storage media such as backup tapes or optical storage discs.

In some embodiments, data segments included in the original file system are copied to the replicated file system via removable storage media and initialization is completed via the network. The replicator updates changes to the original file system on the replicated file system, keeping the two file systems synchronized. The replicator may be implemented as a process and/or device separate from the storage systems and/or file systems, a process and/or device that is a part of one or both of the storage systems and/or file system, or any other appropriate means. For example, in some embodiments, the replicator is a standalone device capable of communicating with the file systems. It determines the necessary updates by communicating with the original file system, and sends the updates to the replicated file system. The replicated file system is configured to answer queries, accept the updates, and modify the contents in the file system accordingly. In some embodiments, the replicator's functions are implemented as separate processes on the storage systems.

It is possible to represent files in other ways, such as using a mixture of byte sequences and references to byte sequences in other files. The byte sequences are treated as data segment. The identifiers used to reference the segments are substantially shorter than the segments themselves. Therefore, using identifiers allows more efficient use of available storage space. In some embodiments, the data segments and data segment identifiers are replicated on the replicated file system. In some embodiments, metadata of files are also updated. As used herein, metadata includes data associated with various attributes of the file, such as file name, file length, date stamp, permission, whether a file has been removed from the current file system, whether a file has been renamed, etc.

In some embodiment, only the files that have been updated or newly references are replicated. A file is deemed to have been updated if it has been modified in some way since the last replication, such as having been edited, created, renamed, deleted, had a permission change, etc. If the file has not been updated, nothing needs to be done to it in terms of replication. Any data segment that has been previously stored on the replicated file system, but is newly referenced by the file being processed is located. In some embodiments, a data segment is deemed to be newly referenced if it was not referenced by the file at the time of the last replication, as a data segment that has been added or modified since the last replication.

In some embodiments, a data segment is deemed to be newly referenced if it was never referenced by the file during the file's replication history, or was not referenced within some number of replications. A data segment may be previously stored on the replicated file system, but is still newly referenced by the file if the data segment was previously stored on the replicated file system by another file, by a client writing to the replicated file system, or by some other preloading/initialization mechanism. Since the data segments have been previously stored, they do not need to be replicated again on the replicated file system. Thus, greater efficiency in replication is achieved, especially in file systems where multiple files share a large amount of identical data. How to locate these previously stored data segments are discussed in more detail below. Further, data segments that have not been previously stored on the replicated file system are located and replicated on the replicated file system. It is possible in some situations that all the data segments included in the file have been previously stored on the replicated file system therefore no additional replication is necessary. It is also possible that there is no previously stored data segment and all the data segments in the file need to be replicated.

In some embodiments, a log record is used to track the file system operations, recording file updates as they occur. Depending on implementation, the entries in the log record may include segment references, content handles, metadata, and other information that can be used for executing operations to synchronize the replicated file system with the original file system. There are a number of ways a log entry is generated, including every time an event (such as file write) occurs, after several events occur, or at a predetermined frequency. In some embodiments, to capture more update information with fewer log entries, each log entry is generated only when a key event occurs, such as when a file closes, after a predetermined idle period has lapsed, when a snapshot of the file system is created, etc. During replication, the log record is processed, and updated files are determined based on log entries indicating file update operations such as file modification, file creation, etc.

In some embodiments, a snapshot is taken immediately before a replication starts. The snapshot records information of the file system at a point in time. It may be a snapshot of the entire file system, or a snapshot of one or more individual files. The snapshot may include information such as data segment references, content handles, etc. In some embodiments, prior to the next replication operation, the current states of the system are compared to a snapshot of the system to determine which files have been updated. In some embodiments, the current states of a file are compared to a snapshot of the file to determine whether the file has been updated.

In processing data segments, there are a number of ways to locate data segments that have not been stored previously on the replicated file system, some of which are described below although any other appropriate technique may be used. In some embodiments, log records are used. Log entries record operations on the original file system. In some embodiments, when a file is updated, a log entry including information about the file's data segment references is created. Offsets of the new data segment references, and other information that may assist in file replication are also recorded as appropriate. During replication, based on the log records of the new data segment references, it is determined whether the data segment being referenced has been stored already.

In some embodiments, upon receiving a query, the data segment reference on the replicated file system is looked up by the replicator or the replicated file system in a database of stored data segment identifiers, to determine whether such a data segment has been stored previously, and provides a response based on the lookup result. In some embodiments, the data segment reference under evaluation is compared with the data segment references known at the time of last replication. The comparison can be carried out by the original file system or by the replicator. If the data segment reference can be found in existing data segment references, it indicates that the corresponding data segment has already been stored. Else, the corresponding data segment may not have been stored and may need to be replicated. In some embodiments, all such segments are replicated. In other embodiments, a query of the replicator or replicated file system determines whether the segment is replicated or not as described above. In all cases, many segments are not replicated even though new references to those segments are. Thus, the available bandwidth of the storage systems and the network connecting them is more efficiently utilized.

In some embodiments, when a file is updated, a log entry including information about the file's content handle is created. In some embodiments, to reduce the amount of processing, a log entry including content handle information is created after multiple updates, or upon certain key event such as when a file is closed. The content handle indirectly references the data segments included in the file and may be analyzed to obtain data segment references.

File System

A file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below.

Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block.

There are at least fifteen block pointer entries in a block pointer array contained in an inode of a file. The first of up to twelve entries of block pointers in the inode directly point to the first of up to twelve data blocks of the file. If the file contains more than twelve data blocks, then the thirteenth entry of the block pointer array contains an indirect block pointer pointing to an indirect block containing pointers to one or more additional data blocks. If the file contains so many data blocks that the indirect block becomes full of block pointers, then the fourteenth entry of the block pointer array contains a double indirect block pointer to an indirect block that itself points to an indirect block that points to one or more additional data blocks. If the file is so large that the indirect block becomes full of block pointers and its descendant indirect blocks are also full of block pointers, then the fifteenth entry of the block pointer array includes another level of indirection where the block pointer entry contains a triple indirect block pointer to an indirect block that points to an indirect block that points to an indirect block that points to one or more additional data blocks. Similarly, there exists fourth and fifth level of indirections. Once the indirect blocks at last level of indirection and its descendant indirect blocks become full of pointers, the file contains a maximum permitted number of data blocks. Further, an indirect block at the last level of indirection is also referred to as a leaf indirect block.

Figure 2:
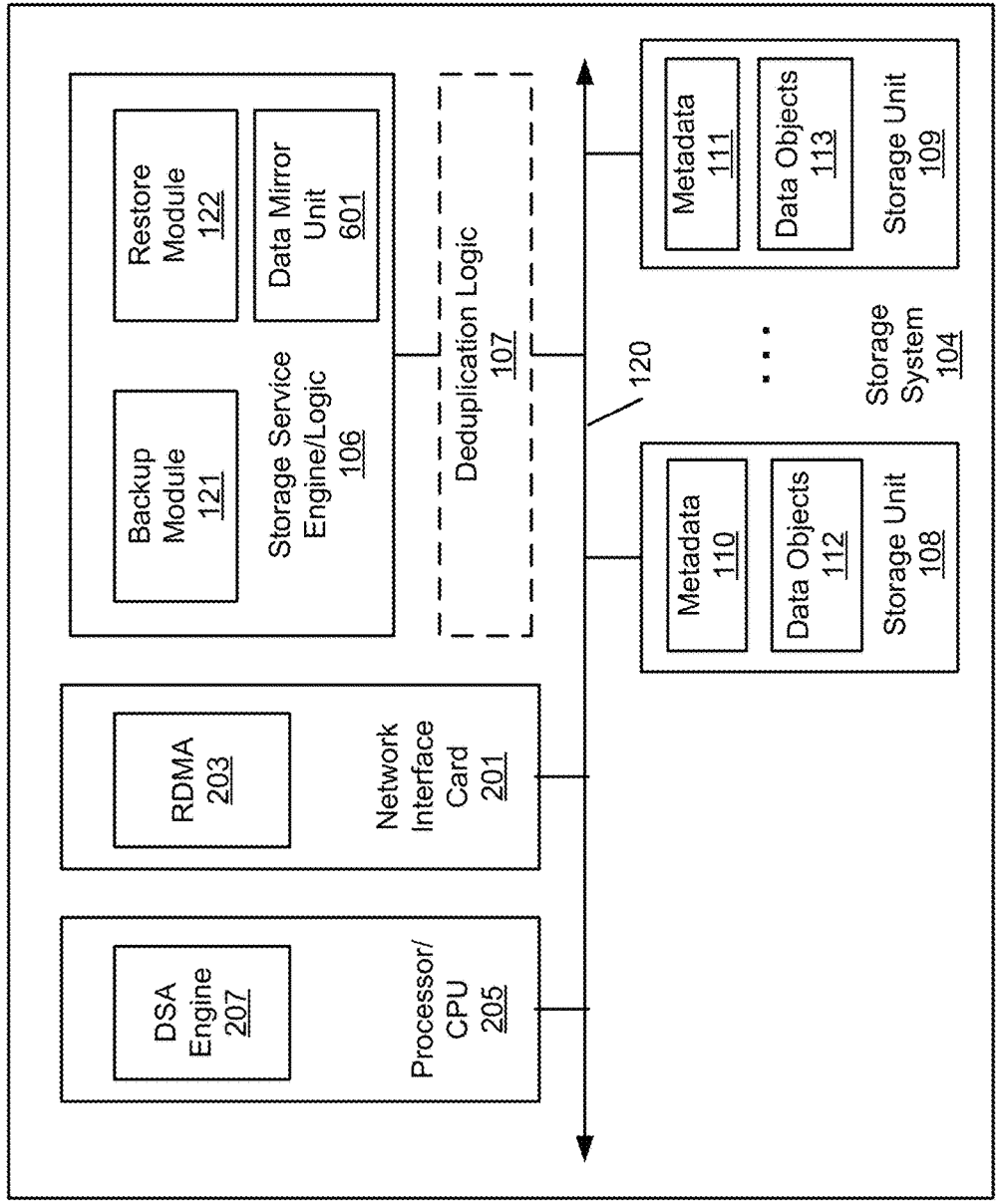
FIG. 2 is a block diagram illustrating a data mirroring system, according to an embodiment of the application.

FIG. 2 is a block diagram illustrating a data mirroring system 200 according to one embodiment of the disclosure. System 200 may be implemented as part of storage system 104 of FIG. 1. Referring to FIG. 2, In one embodiment, storage system 104 includes, but is not limited to, storage service engine 106 (also referred to as service logic, service module, or service unit, which may be implemented in software, hardware, or a combination thereof), optional deduplication logic 107, network interface card 201, processors (e.g., CPU) 205, and one or more persistent storage units or devices 108-109 communicatively coupled to each other via interconnect 120, which may be a bus and/or a network (e.g., a storage network or a network similar to network 103).

For example, network interface card 201 includes, but is not limited to, remote direct memory access (RDMA) 203. Processors 205 includes, but not limited to, Data Streaming Accelerator (DSA) engine 207. Storage service engine 106 may represent any storage service related components configured or adapted to provide storage services (e.g., storage as a service) to a variety of clients using any of the access protocols set forth above. For example, storage service engine 106 may include backup logic 121, restore logic and compress module 122 and data mirror unit 601. In an embodiment, data mirror unit 601 is configured to implement the data mirroring, such as supporting optimized persistent memory mirroring.

Figure 3:
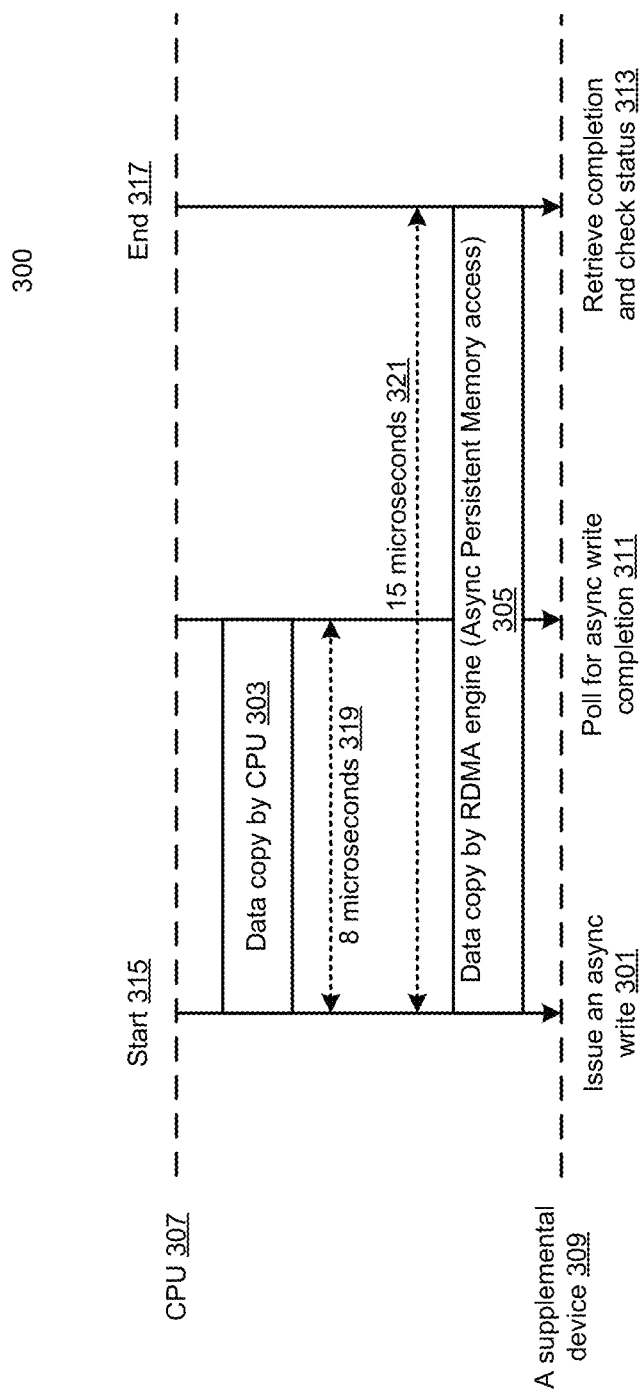
FIG. 3 is a block diagram illustrating a process of a data mirroring system, according to an embodiment of the application.

FIG. 3 is a block diagram illustrating a process 300 of a data mirroring system, according to an embodiment of the application. For example, in FIG. 3, the data mirror system receives a request to write data to a first local persistence memory of the computing device from an application executing on a computing device (e.g., 101) of the data mirror system (e.g., 104). In one embodiment, the application is executed on the data mirror system (e.g., 104). Then the data mirror system issues an async write operation (e.g., 301) to mirror the write request to write a same data to a second local persistence memory of the computing device (e.g., 305) by using a supplemental device (e.g., 309). The supplemental device (e.g., 309) can be RDMA engine (e.g., 203) within the network interface card (e.g., 201) or a DSA engine (e.g., 207) within a processor, such as CPU.

Next, the data mirror system performs a write operation (e.g., 303) to write the data to the first local persistence memory by using CPU (e.g., 307) from the processing resource of the computing device. In response to determining that the write operation is completed and the async write operation is completed (e.g., 311), the data mirroring system determines a status check result indicating if the async write operation is successful (e.g., 313). Then, the data mirror system sends the status check result to the application.

In some embodiments, the supplemental device (e.g., 309) is a Data Streaming Accelerator (DSA) engine inside a processor. In some embodiments, the supplemental device (e.g., 309) is a remote direct memory access (RDMA) network interface card. In some embodiments, the supplemental device (e.g., 309) is a Data Streaming Accelerator (DSA) engine inside a processor. In some embodiments, the supplemental device (e.g., 309) can be implemented by software, such as the network stack, implemented by a runtime library, or implemented as a virtual device of a runtime library.

In some embodiments, the data mirror system determines whether the copied data through the async write operation is successful (e.g., 311). For example, when the copied data through the async operation meets an error threshold, the copied data through the async write operation is successful. On the other hand, when the copied data through the async operation fails to meet an error threshold, the copied data through the async write operation is not successful.

In some embodiments, when the data mirror system determines that the async write operation is successful (e.g., 311), the data mirror system then sends the error status check result to the application (e.g., 313). In some embodiments, the data mirror system then issues a second async write operation to mirror the write request to write the same data to the second local persistence memory of the computing device by using the supplemental device.

In some embodiments, the write operation and the async write operation started substantially at the same time (e.g., 315). In some embodiments, the async write operation takes longer (e.g., 317) than the write operation (e.g., 315). For example, it takes 8 microseconds to complete the write operation (e.g., 319). On the other hand, it takes 15 microseconds (e.g., 321) to complete the async write operation. In other embodiments, the async write operation takes equal or less time than the write operation.

The according pseudo code snippet can be like this:

```
int write_to_persistent_memory_with_mirror_coordinated( )
{
...
    pmem_memcpy_async( );              /* Issue an async write to mirror data from source */
  pmem_memcpy( );                      /* Copy data from source by CPU */
  pmem_wait_for_completion_async( );   /* Blocking interface. Give up CPU and sleep */
  get_and_process_completion( );       /* Check async copy status and handle errors */
...
}
```

From caller point of view, process 300 of a data mirroring system guarantees that the original data and its mirror are safely stored on Persistent Memory before the procedure returns. Therefore, the performance is promising. For example, the latency numbers used in the diagram is from DellEMC 16G PowerEdge prototype system and Mellanox ConnectX-5 100 Gb HCA. For 48 KB data packet (the size of vast majority of Persistent Memory workloads on PowerProtect DD), the latency of process 300 is roughly equals to that of using CPU memory copy twice. In other word, this method nearly does not enlarge the latency.

In addition, compared to using CPU memory copy twice, process 300 saves CPU utilization by nearly 50%. Further, because of the data mirror is stored already, applications can safely recover from the mirrored data.

In one embodiment, the RDMA-based async interfaces can be replaced by Intel DSA.

Furthermore, process 300 provides a high-level protection against uncorrectable errors but does not sacrifice CPU utilization. That is, process 300 saves CPU resource, benefiting system's overall performance.

It should be noted that Async Persistent Memory Data Mirroring can provide better latency than conventional data mirroring (double memory copy by CPU). For example, coordinated Persistent Memory Data Mirroring has a greater chance to provide better latency than conventional data mirroring if leveraging Intel DSA or a powerful RDMA NIC (maybe ConnectX-6). In other words, the coordinated approach guarantees availability of mirrored data while sacrifice a bit of performance.

Figure 4:
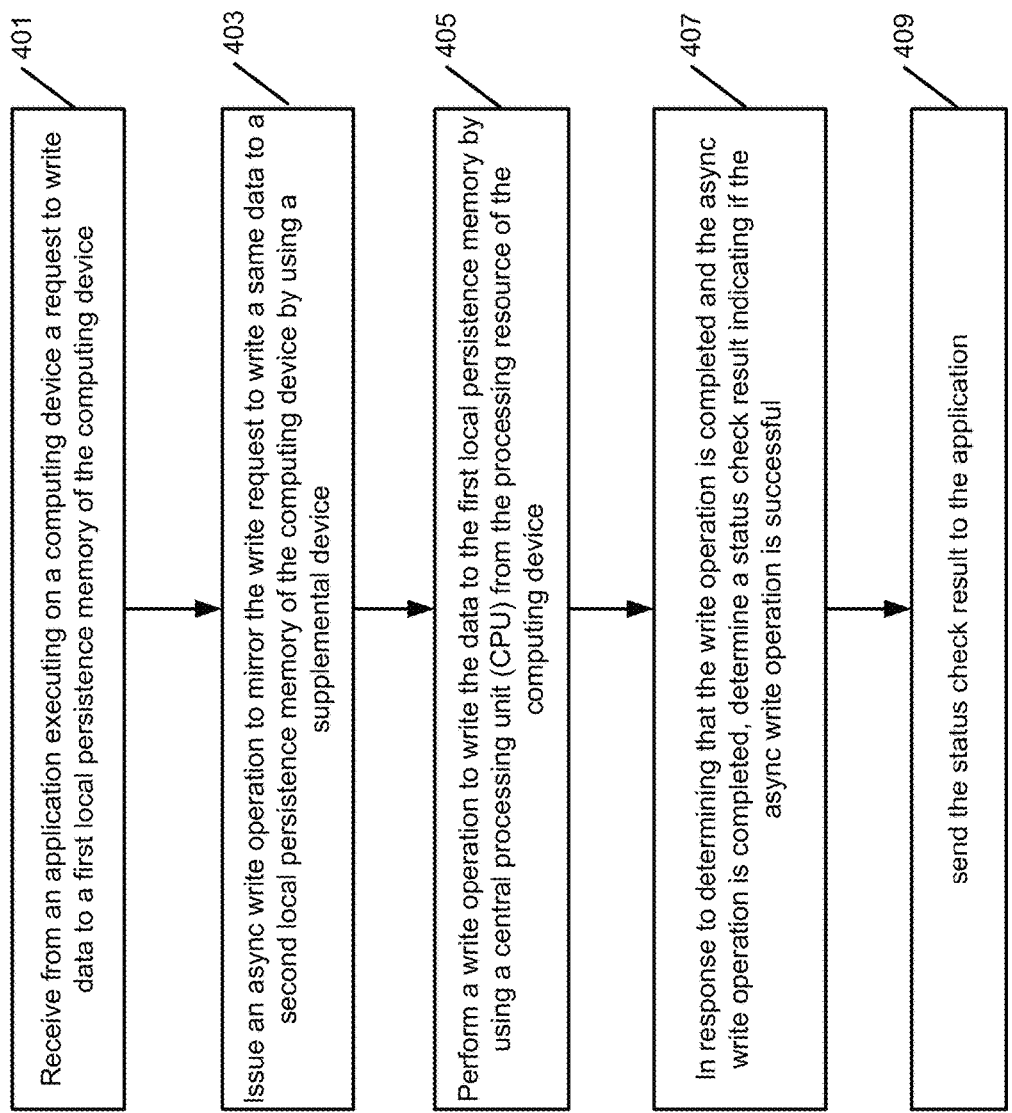
FIG. 4 is a flowchart illustrating a process for a data mirroring system to perform data mirroring, according to an embodiment of the application.

FIG. 4 is a flowchart illustrating process 400 for a data mirroring system (e.g., 104) to perform data mirroring, according to an embodiment of the application. Process 400 can be implemented by software, hardware, or a combination thereof. Process 400 can be performed by a processor of a data mirror system (e.g., 104) by executing mirror module 601 of FIG. 2. In an embodiment, at operation 401, processing logic receives a request to write data to a first local persistence memory of the computing device an application executing on a computing device of the data mirror system.

Further, at operation 403, processing logic issues an async write operation (e.g., 301) to mirror the write request to write a same data to a second local persistence memory of the computing device (e.g., 305) by using a supplemental device. It should be noted that the async write operation won't be performed by the processor. It will be performed by a RDMA engine in a standalone NIC card or a NIC interface chip on the motherboard, or a DSA engine for an intel CPU, or a virtual device of a runtime library. The processor (e.g., CPU) only issues an async request, and then forgets about it. Later, the engine will inform CPU when the operation is completed.

Furthermore, at operation 405, the processor of the data mirroring system performs a write operation (e.g., 303) to write the data to the first local persistence memory by using CPU (e.g., 307) from the processing resource of the computing device.

In addition, at operation 407, in response to determining that the write operation is completed and the async write operation is completed (e.g., 311), the processor of the data mirroring system determines a status check result indicating if the async write operation is successful.

Next, at operation 409, the processor of the data mirroring system sends the status check result to the application. For example, if the processor of the data mirroring system determines an error status check result indicating that the async write operation is not successful, the application will then reissue the async write operation.

Figure 5:
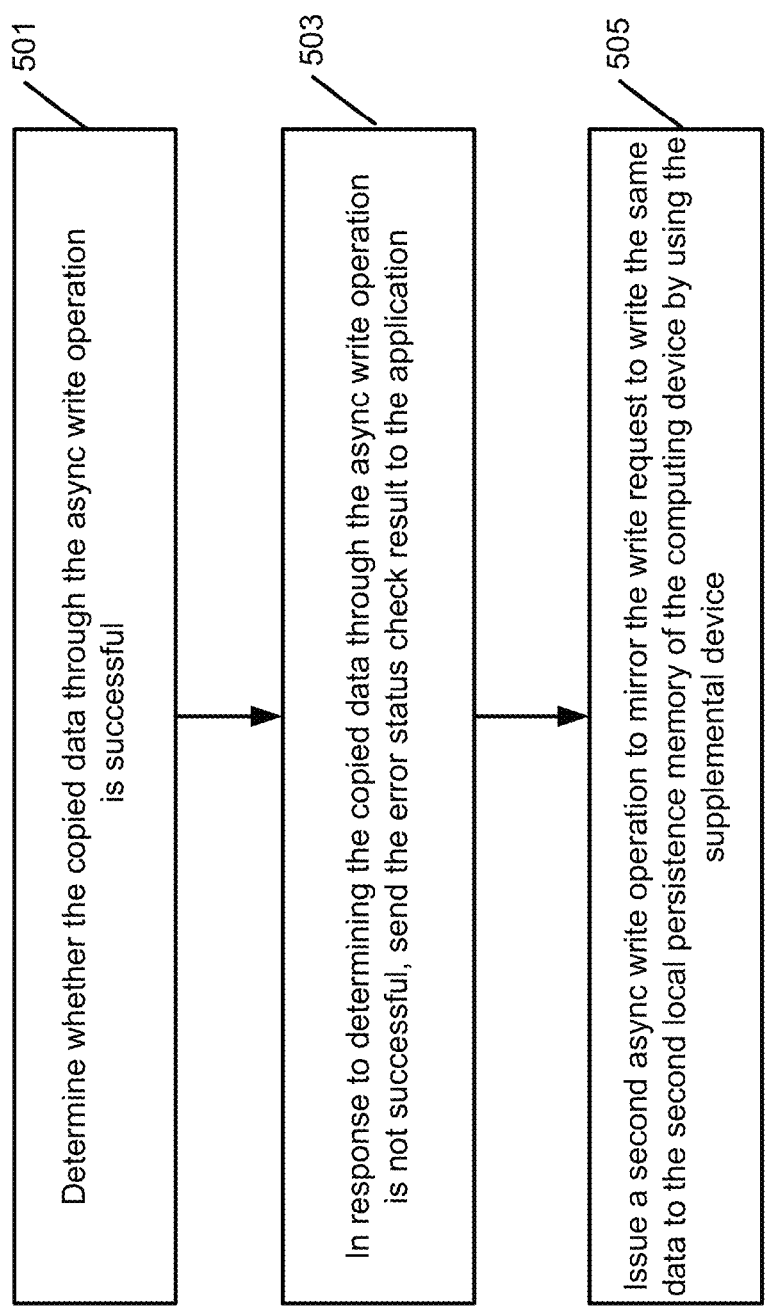
FIG. 5 is a flowchart illustrating a process for a data mirroring system to perform data mirroring, according to an embodiment of the application.

FIG. 5 is a flowchart illustrating a process 500 for a data mirroring system to perform data mirroring, according to an embodiment of the application. In an embodiment, at operation 501, the processor of the data mirroring system determines whether the copied data through the async write operation is successful.

Further, at operation 503, in response to determining the copied data through the async write operation is not successful, the processor of the data mirroring system sends the error status check result to the application.

Furthermore, at operation 505, the processor of the data mirroring system issues a second async write operation to mirror the write request to write the same data to the second local persistence memory of the computing device by using the supplemental device.

Figure 6:
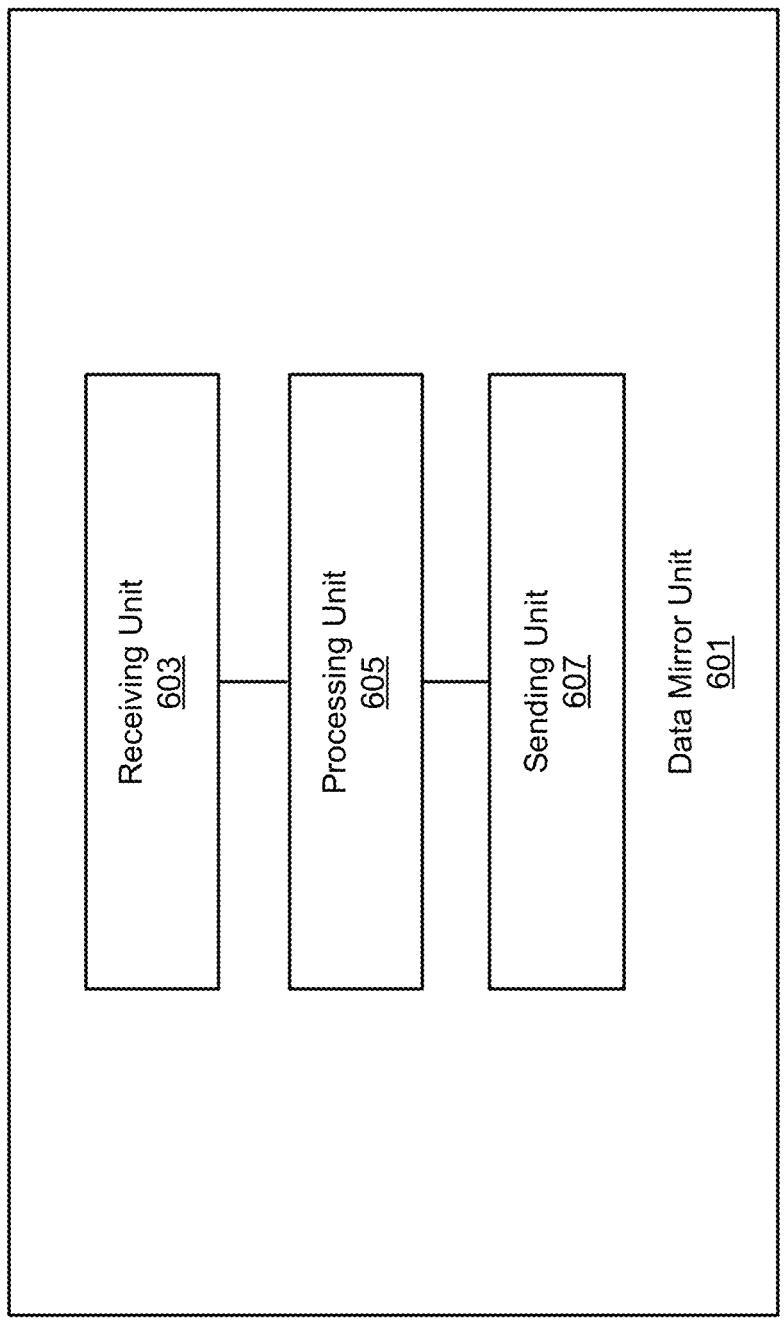
FIG. 6 is a schematic diagram of a structure of a data mirroring system, according to an embodiment of this application.

FIG. 6 is a schematic diagram 600 of a structure of a data mirroring system, according to an embodiment of this application. Data mirror unit 601 includes receiving unit 603, processing unit 605, and sending unit 607. In some embodiments, data mirror unit 601 is used to execute the flow charts of FIG. 4 and FIG. 5.

In some embodiments, receiving unit 603 is configured to receive from an application executing on a computing device a request to write data to a first local persistence memory of the computing device.

In some embodiments, processing unit 605 is configured to issue an async write operation to mirror the write request to write a same data to a second local persistence memory of the computing device by using a supplemental device, perform a write operation to write the data to the first local persistence memory by using a central processing unit (CPU) from the processing resource of the computing device, and determine a status check result indicating if the async write operation is successful in response to determining that the write operation is completed and the async write operation is completed.

In some embodiments, sending unit 607 is configured to send the status check result to the application.

Note that some or all of the components as shown and described above (e.g., 601, 201, 203, 205, 207 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
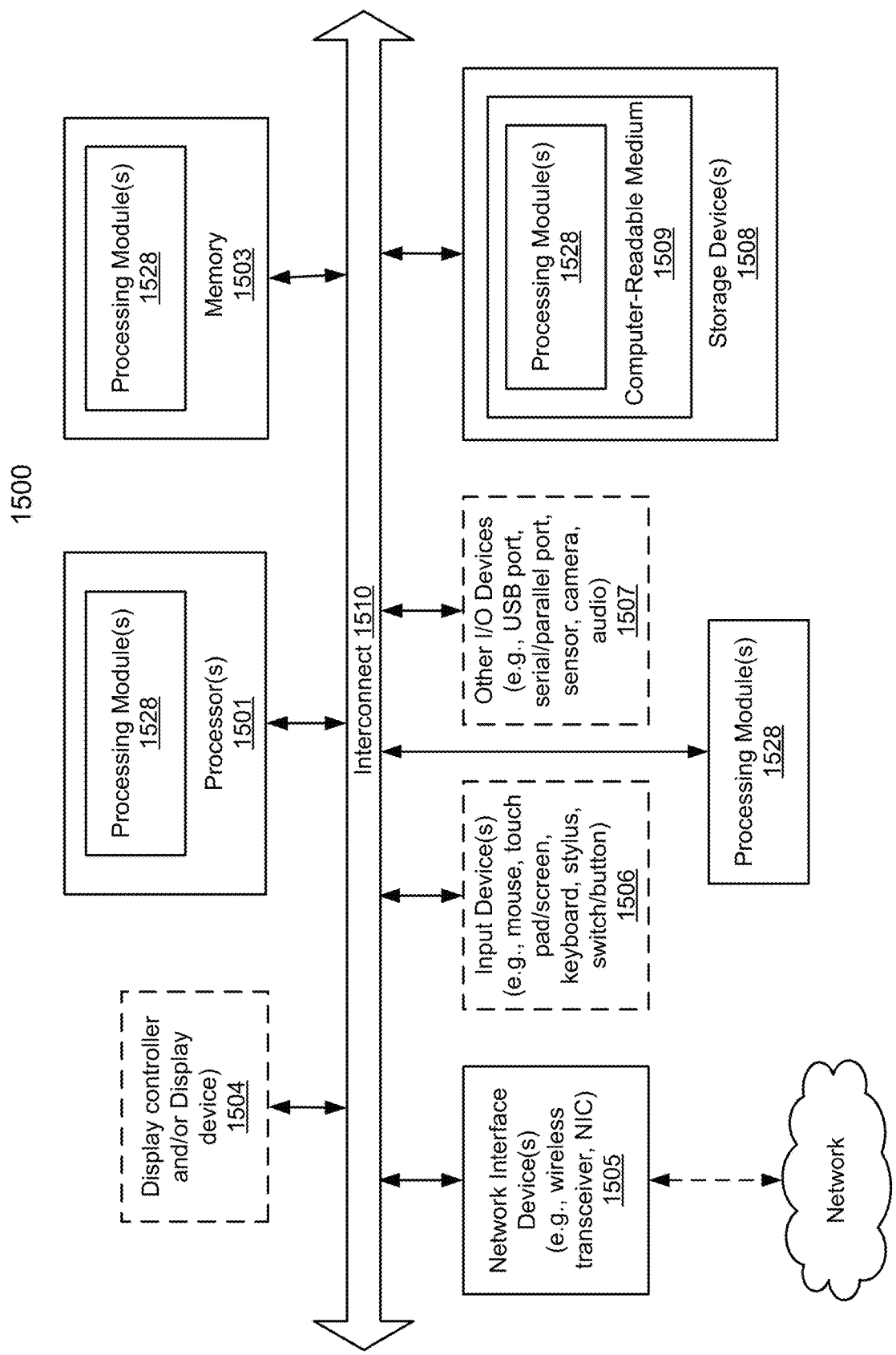
FIG. 7 is a block diagram illustrating a coordinated persistent memory data mirroring system, according to an embodiment of the application.

FIG. 7 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, a restore module, a data mirror unit, network interface card, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs, or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   receiving, by at least one processor of a processing resource, from an application executing on a computing device a request to write data to a first local persistence memory of the computing device;
   issuing, by the at least one processor, an async write operation to mirror the write request to write a same data to a second local persistence memory of the computing device by using a supplemental device;
   performing, by the at least one processor, a write operation to write the data to the first local persistence memory by using a central processing unit (CPU) from the processing resource of the computing device;
   in response to determining that the write operation is completed and the async write operation is completed, determining, by the at least one processor, a status check result indicating if the async write operation is successful; and
   sending, by the at least one processor, the status check result to the application.

2. The method of claim 1, wherein the supplemental device is different from the CPU to reduce a workload from the CPU.

3. The method of claim 1, wherein the supplemental device is a remote direct memory access (RDMA) network interface card.

4. The method of claim 1, wherein the supplemental device is a Data Streaming Accelerator (DSA) engine inside a processor.

5. The method of claim 1, wherein the supplemental device includes a virtual device of a runtime library.

6. The method of claim 1, wherein the determining the status check result further comprises:
   determining whether the copied data through the async write operation is successful, wherein when the copied data through the async operation meets an error threshold, the copied data through the async write operation is successful; and
   in response to determining the copied data through the async write operation is not successful, sending the error status check result to the application; and
   issuing a second async write operation to mirror the write request to write the same data to the second local persistence memory of the computing device by using the supplemental device.

7. The method of claim 1, wherein the write operation and the async write operation started substantially at the same time.

8. The method of claim 1, wherein the async write operation takes longer than the write operation.

9. A non-transitory machine-readable medium having instructions stored therein, which when executed by a processor, cause the processor to perform:
   receiving from an application executing on a computing device a request to write data to a first local persistence memory of the computing device;
   issuing an async write operation to mirror the write request to write a same data to a second local persistence memory of the computing device by using a supplemental device;
   performing a write operation to write the data to the first local persistence memory by using a central processing unit (CPU) from the processing resource of the computing device;
   in response to determining that the write operation is completed and the async write operation is completed, determining a status check result indicating if the async write operation is successful; and
   sending the status check result to the application.

10. The non-transitory machine-readable medium of claim 9, wherein the supplemental device is different from the CPU to reduce a workload from the CPU.

11. The non-transitory machine-readable medium of claim 9, wherein the supplemental device is a remote direct memory access (RDMA) network interface card.

12. The non-transitory machine-readable medium of claim 9, wherein the supplemental device is a Data Streaming Accelerator (DSA) engine inside a processor.

13. The non-transitory machine-readable medium of claim 9, wherein the supplemental device includes a virtual device of a runtime library.

14. The non-transitory machine-readable medium of claim 9, wherein the determining the status check result further comprises:
   determining whether the copied data through the async write operation is successful, wherein when the copied data through the async operation meets an error threshold, the copied data through the async write operation is successful; and
   in response to determining the copied data through the async write operation is not successful, sending the error status check result to the application; and
   issuing a second async write operation to mirror the write request to write the same data to the second local persistence memory of the computing device by using the supplemental device.

15. The non-transitory machine-readable medium of claim 9, wherein the write operation and the async write operation started substantially at the same time.

16. The non-transitory machine-readable medium of claim 9, wherein the async write operation takes longer than the write operation.

17. A system, comprising:
   a processor; and
   a memory coupled to the processor to store instructions, which when executed by the processor, cause the processor to perform:
   receiving from an application executing on a computing device a request to write data to a first local persistence memory of the computing device;
   issuing an async write operation to mirror the write request to write a same data to a second local persistence memory of the computing device by using a supplemental device;
   performing a write operation to write the data to the first local persistence memory by using a central processing unit (CPU) from the processing resource of the computing device;
   in response to determining that the write operation is completed and the async write operation is completed, determining a status check result indicating if the async write operation is successful; and sending the status check result to the application.

18. The system of claim 17, wherein the supplemental device is different from the CPU to reduce a workload from the CPU.

19. The system of claim 17, wherein the supplemental device is a remote direct memory access (RDMA) network interface card.

20. The system of claim 17, wherein the supplemental device is a Data Streaming Accelerator (DSA) engine inside a processor.

* * * * *